(12) United States Patent
Nishimura et al.

(10) Patent No.: US 11,535,767 B2
(45) Date of Patent: Dec. 27, 2022

(54) SILVER PASTE

(71) Applicant: SHOEI CHEMICAL INC., Tokyo (JP)

(72) Inventors: Kousuke Nishimura, Tosu (JP); Naoto Shindo, Tosu (JP); Hiroshi Mashima, Tosu (JP); Yuji Akimoto, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 17/417,895

(22) PCT Filed: Nov. 28, 2019

(86) PCT No.: PCT/JP2019/046482
§ 371 (c)(1),
(2) Date: Jun. 24, 2021

(87) PCT Pub. No.: WO2020/137331
PCT Pub. Date: Jul. 2, 2020

(65) Prior Publication Data
US 2022/0089894 A1    Mar. 24, 2022

(30) Foreign Application Priority Data
Dec. 26, 2018 (JP) ............................. JP2018-242807

(51) Int. Cl.
*C09D 11/52* (2014.01)
*B22F 1/107* (2022.01)
(Continued)

(52) U.S. Cl.
CPC .............. *C09D 11/52* (2013.01); *B22F 1/107* (2022.01); *C09D 11/033* (2013.01);
(Continued)

(58) Field of Classification Search
CPC .. B22F 1/052; B22F 1/09; B22F 1/107; B22F 2007/047; B22F 2301/255; B22F 2304/10;
(Continued)

(56) References Cited

U.S. PATENT DOCUMENTS

2020/0238388 A1* 7/2020 Michiaki .................. B22F 7/04

FOREIGN PATENT DOCUMENTS

JP    2003280179 A    10/2003
JP    2004220807 A    8/2004
(Continued)

*Primary Examiner* — Mark Kopec
*Assistant Examiner* — Jaison P Thomas
(74) *Attorney, Agent, or Firm* — Alleman Hall Creasman & Tuttle LLP

(57) ABSTRACT

The present invention provides a silver paste containing at least a silver powder, a binder resin, and an organic solvent, wherein the silver powder contains a first silver powder having a D50 of 3.50 to 7.50 μm and a second silver powder having a D50 of 0.80 to 2.00 μm, where D50 represents a 50% value of a volume-based cumulative fraction obtained by laser diffraction particle size distribution measurement; a copper content of the whole silver powder is 10 to 5000 ppm by mass; a copper content of the second silver powder is 80 ppm by mass or more; and the first silver powder contains substantially no copper. The present invention provides a silver paste containing a powder in a high concentration and excellent in printability, and provides a silver conductor film that has a high filling factor, a high film density, high electrical conductivity, and excellent migration resistance.

18 Claims, 2 Drawing Sheets

(51) Int. Cl.
 C09D 11/033 (2014.01)
 C09D 11/037 (2014.01)
 C09D 11/14 (2006.01)
 H01B 1/22 (2006.01)
(52) U.S. Cl.
 CPC ............ *C09D 11/037* (2013.01); *C09D 11/14* (2013.01); *H01B 1/22* (2013.01); *B22F 2301/255* (2013.01); *B22F 2304/10* (2013.01)
(58) Field of Classification Search
 CPC ...... B22F 2999/00; B22F 7/04; C09D 11/033; C09D 11/037; C09D 11/14; C09D 11/52; H01B 1/00; H01B 1/02; H01B 1/22; C22C 1/0466; C22C 5/08
 See application file for complete search history.

(56) References Cited

FOREIGN PATENT DOCUMENTS

| | | | |
|---|---|---|---|
| JP | 2005174824 | A | 6/2005 |
| JP | 2005203304 | A | 7/2005 |
| JP | 2007131950 | A | 5/2007 |
| JP | 2008192565 | A | 8/2008 |
| JP | 2011021271 | A | 2/2011 |
| JP | 2014197483 | A | 10/2014 |
| JP | 2018055883 | A | 4/2018 |
| WO | 2014061765 | A1 | 4/2014 |
| WO | 2018025627 | A1 | 2/2018 |

* cited by examiner

SILVER PASTE

TECHNICAL FIELD

The present invention relates to a baked silver paste that contains a silver powder, and is used for forming an internal electrode or an external electrode included in a ceramic electronic component such as a multilayer ceramic capacitor, an inductor, or an actuator.

BACKGROUND ART

An electrically conductive paste containing a metal powder to be used for forming an internal electrode or an external electrode of an electronic component has been conventionally widely used. One of the reasons is that an electronically conductive paste containing a metal powder is applicable to various printing methods such as a screen printing method, an offset printing method, a gravure printing method, an inkjet method, a dipping method, a dispensing method, a brush coating method, and a spin coating method, and can form a thick film by performing coating printing once, and hence is advantageous for obtaining a high electrical conductivity as compared with, for example, an electrically conductive ink using an organic metal compound, or the like.

Besides, in order to obtain a high electrical conductivity, a content of the metal powder contained in the electrically conductive paste is preferably higher, and a coating film obtained by printing the paste is required to be dense and have a high density. When the content of the metal powder is high, definite conductivity can be obtained even in pattern formation further refined in the future.

For example, Patent Literature 1 (Japanese Patent Laid-Open No. 2005-174824) discloses the following invention: A metal colloidal particle is used instead of a metal powder for obtaining a highly dense and a highly conductive film, and an organic metal compound is used together to fill a gap between the metal colloidal particles with the organic metal compound, and thus, denseness is increased.

The metal colloidal particle and the organic metal compound contain a large amount of organic components, however, and therefore, if these are used as principal conductive components, a content of a metal component is lower than in a paste using a metal powder, and hence a conductor film with a low specific resistance cannot be obtained. In addition, it is difficult to apply to the above-described various printing methods, and if a large amount of a binder resin, such as a viscosity modifier or the like, is added to the paste for solving this problem, a metal ratio in a resultant coating film is further reduced.

Meanwhile, when a metal powder is used as an electrically conductive component of a paste, a conductor film having a low specific resistance can be obtained if the content of the metal powder is high, but printability is deteriorated as the content of the metal powder is higher. Therefore, in a silver paste, for example, a coating film density described in Patent Literature 2 is 5.4 g/cm³ at the most, and a coating film density described in Patent Literature 3 is about 5.70 g/cm³ at the most. Besides, Patent Literature 4 discloses an example of a nickel paste having a dry film density of 6.2 g/cm³.

In an electrically conductive paste, when a dense coating film is obtained for attaining a high electrical conductivity, printability is sacrificed as in these techniques, and thus, there is a trade-off (antinomic) relationship therebetween. Therefore, there is a demand for an electrically conductive paste capable of simultaneously attaining dense coating film formation and good printability.

There are known cases where two types of silver powders having different particle sizes, that is large and small sizes, are used for obtaining a dense coating film (Patent Literature 5 and Patent Literature 6). However, in particular, in a silver paste using a silver powder, a phenomenon designated as migration is known, and as the amount of the silver powder having a small size (of, for example, less than 0.5 μm) contained in the silver paste is larger, migration more easily occurs.

In order to inhibit the migration, various attempts have been conventionally made by addition of a migration inhibitor containing fluorine to a silver paste (Patent Literature 7), and addition of a mixed powder, an alloy powder, a compound powder or the like containing three elements of copper, tin and manganese to a silver powder (Patent Literature 8).

CITATION LIST

Patent Literature

[Patent Literature 1] Japanese Patent Laid-Open No. 2005-174824
[Patent Literature 2] Japanese Patent Laid-Open No. 2007-131950
[Patent Literature 3] Japanese Patent Laid-Open No. 2008-192565
[Patent Literature 4] Japanese Patent Laid-Open No. 2004-220807
[Patent Literature 5] Japanese Patent Laid-Open No. 2003-280179
[Patent Literature 6] Japanese Patent Laid-Open No. 2005-203304
[Patent Literature 7] Japanese Patent Laid-Open No. 2014-197483
[Patent Literature 8] International Publication No. WO2014/061765

SUMMARY OF INVENTION

Technical Problem

It is, however, not preferable for obtaining high electrical conductivity to add a large amount of a component different from a silver powder to a paste as described above for purpose of preventing migration.

Accordingly, the present invention aims to solve these problems. Specifically, an object of the present invention is to provide a silver paste that contains a silver powder in a high concentration and is excellent in printability, and to accordingly provide a silver conductor film that has a high filling factor and a high film density, exhibits high electrical conductivity, and is excellent in migration resistance.

Solution to Problem

As a result of earnest studies made for solving the above-described problems, the present inventors found the following: Even in a case where a silver powder is contained in a high concentration in a paste, a dense dry film can be obtained without sacrificing printability when the following conditions are satisfied: [1] the silver powder contains both of a first silver powder (a) having a D50 of 3.50 to 7.50 μm and a second silver powder (b) having a D50 of 0.80 to 2.70 μm, where D50 represents a 50% value of a volume-based cumulative fraction obtained by laser diffraction particle size distribution measurement; [2] a copper content of the whole silver powder is 10 to 5000 ppm by mass; [3] a copper content of the second silver powder (b) is 80 ppm by mass or more; and [4] the first silver powder (a) contains substantially no copper. In addition, migration can be effectively inhibited by causing a minimum necessary amount of a copper component to be contained in the silver powder. Thus, the present invention was accomplished.

Specifically, a present invention (1) provides a silver paste containing at least a silver powder, a binder resin, and an organic solvent, in which the silver powder satisfies all of the following conditions [1] to [4]: [1] the silver powder contains a first silver powder (a) having a D50 of 3.50 to 7.50 µm and a second silver powder (b) having a D50 of 0.80 to 2.70 µm, where D50 represents a 50% value of a volume-based cumulative fraction obtained by laser diffraction particle size distribution measurement; [2] a copper content of the whole silver powder is 10 to 5000 ppm by mass; [3] a copper content of the second silver powder (b) is 80 ppm by mass or more; and [4] the first silver powder (a) contains substantially no copper.

A present invention (2) provides the silver paste according to (1), in which the second silver powder (a) has a D10 of 0.70 µm or more, where D10 represents a 10% value of a volume-based cumulative fraction obtained by laser diffraction particle size distribution measurement.

A present invention (3) provides the silver paste according to (1) or (2), in which a copper content of the first silver powder (a) is less than 50 ppm by mass.

A present invention (4) provides the silver paste according to any one of (1) to (3), in which the first silver powder (a) has a D50 of 3.70 to 7.50 µm.

A present invention (5) provides the silver paste according to any one of (1) to (3), in which the first silver powder (a) has a D50 of 4.00 to 6.00 µm.

A present invention (6) provides the silver paste according to any one of (1) to (5), in which the second silver powder (b) has a D50 of 0.80 to 2.00 µm.

A present invention (7) provides the silver paste according to any one of (1) to (6), in which the whole silver powder has a D10 of 1.00 to 3.00 µm, and a D50 of 3.00 to 7.00 µm.

A present invention (8) provides the silver paste according to (7), in which the whole silver powder has a D10 of 1.20 to 2.00 µm.

A present invention (9) provides the silver paste according to (7) or (8), in which the whole silver powder has a D50 of 3.90 to 5.00 µm.

A present invention (10) provides the silver paste according to any one of (1) to (9), in which a copper content of the whole silver powder is 30 to 500 ppm by mass.

A present invention (11) provides the silver paste according to any one of (1) to (10), further satisfying the following condition [5]: [5] a content $C_{AG}$ of the whole silver powder based on the silver paste is 80.00 to 97.00% by mass.

A present invention (12) provides the silver paste according to (11), in which the content $C_{AG}$ of the whole silver powder based on the silver paste is 92.00 to 96.00% by mass.

A present invention (13) provides the silver paste according to any one of (1) to (12), in which the silver paste has a dry film density of 7.50 g/cm³ or more.

A present invention (14) provides the silver paste according to any one of (1) to (13), in which a value $C_{BND}/S_{BET}$ is 2.00 to 3.40, where $S_{BET}$ (m²/g) represents a specific surface area of the whole silver powder, and $C_{BND}$ (% by mass) represents a content percentage of the binder resin based on the whole silver powder.

A present invention (15) provides the silver paste according to any one of (1) to (14), in which a specific surface area $S_{BET}$ of the whole silver powder is 0.10 to 0.30 m²/g.

A present invention (16) provides the silver paste according to any one of (1) to (15), to be used for forming a conductor film by a heat treatment at 700° C. or less.

Advantageous Effects of Invention

The present invention can provide a silver paste that contains a silver powder in a high concentration and is excellent in printability, and accordingly provide a silver conductor film that has a high filling factor and a high film density, exhibits high electrical conductivity, and is excellent in migration resistance.

DESCRIPTION OF EMBODIMENT

Figure 1:
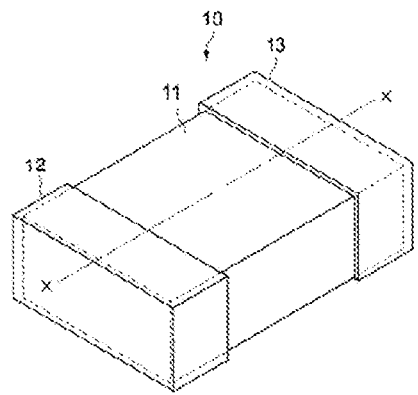
FIG. 1 is an external view of a multilayer inductor.

A silver paste of the present invention is a silver paste containing at least a silver powder, a binder resin, and an organic solvent, wherein the silver powder satisfies all of the following conditions [1] to [4]: [1] the silver powder contains a first silver powder (a) having a D50 of 3.50 to 7.50 µm and a second silver powder (b) having a D50 of 0.80 to 2.70 µm, where D50 represents a 50% value of a volume-based cumulative fraction obtained by laser diffraction particle size distribution measurement; [2] a copper content of the whole silver powder is 10 to 5000 ppm by mass; [3] a copper content of the second silver powder (b) is 80 ppm by mass or more; and [4] the first silver powder (a) contains substantially no copper.

In the present invention, D10 and D50 respectively refer to a 10% value and a 50% value of a volume-based cumulative fraction obtained by laser diffraction particle size distribution measurement.

The silver paste of the present invention contains at least a silver powder, a binder resin, and an organic solvent.

The silver powder used in the silver paste of the present invention, namely, the silver powder contained in the silver paste of the present invention, is not especially limited in the shape, the particle size, the production method, and the like as long as requirements described below can be met.

The silver powder used in the silver paste of the present invention contains the first silver powder (a) having a D50 of 3.50 to 7.50 µm and the second silver powder (b) having a D50 of 0.80 to 2.70 µm, where D50 represents a 50% value of a volume-based cumulative fraction obtained by laser diffraction particle size distribution measurement. In other words, the silver paste of the present invention uses, as the silver powder, a mixed powder of two types of silver powders having different D50, namely, the first silver powder (a) and the second silver powder (b). Since the first silver powder (a) and the second silver powder (b) having different D50 are used together in the silver paste of the present invention, a dry film density is high. It is noted that the term "to" used herein to indicate a numerical range indicates a range including values preceding and following the term "to" unless otherwise stated. Specifically, for example, a notation "3.50 to 7.50" has the same meaning as "3.50 or more and 7.50 or less" unless otherwise stated.

A copper content of the whole silver powder used in the silver paste of the present invention is 10 to 5000 ppm by mass, and preferably 30 to 500 ppm by mass. Since the copper content of the silver powder falls in this range, migration is difficult to occur. In contrast, when the copper content of the silver powder is lower than the range, migration easily occurs, and when the copper content is over the range, a specific resistance is increased.

In the silver paste of the present invention, among the silver powders, the second silver powder (b) contains copper in a content of 80 ppm by mass or more, but the first silver powder (a) contains substantially no copper. An upper limit of the copper content of the second silver powder (b) is not especially limited as long as the copper content of the whole silver powder satisfies the above-described range, and from the viewpoint that a specific resistance is not too high, the copper content of the second silver powder (b) is preferably 10000 ppm or less, and particularly preferably 8000 ppm or less. In the present invention, that the first silver powder (a) contains substantially no copper means that a copper content of the first silver powder (a) is less than 50 ppm by mass.

In the silver paste of the present invention, the copper content of the whole silver powder is 10 to 5000 ppm by mass, and preferably 30 to 500 ppm by mass, and the first silver powder (a) contains substantially no copper, and therefore, the second silver powder (b) having a smaller D50, out of the first silver powder (a) and the second silver powder (b) contained in the silver powder and having different D50, contains copper in a large amount. Since the second silver powder (b) having a smaller D50 contains a large amount of copper in the silver paste of the present invention, migration is difficult to occur, and in addition, high electrical conductivity can be exhibited.

The shape of the first silver powder (a) may be a granular shape, a flake shape, or an indeterminate shape, and is preferably a spherical shape. In the present invention, the spherical shape refers to a powder in which an average of aspect ratios of arbitrary fifty particles found in the visual field through observation with an SEM (scanning electron microscope) is in a range of 1.0 to 1.5. The average of the aspect ratios is preferably in a range of 1.0 to 1.3.

The D50 of the first silver powder (a) is 3.50 to 7.50 µm, preferably 3.70 to 7.50 µm, and particularly preferably 4.00 to 6.00 µm. When the first silver powder (a) has a D50 falling this range, the D50 of the whole silver powder can be easily controlled, and in addition, a resistance value can be easily lowered.

The shape of the second silver powder (b) may be a granular shape, a flake shape, or an indeterminate shape, and is preferably a spherical shape.

The D50 of the second silver powder (b) is 0.80 to 2.70 µm, may be 0.80 to 2.00 µm, and is preferably 0.80 to 1.80 µm. When the second silver powder (b) has a D50 falling in this range, a conductor film having a high film density and good migration resistance can be easily obtained. The D10 of the second silver powder (b) is preferably 0.70 µm or more. When the second silver powder (b) has a D10 falling in this range, occurrence of a short circuit between conductor films can be easily inhibited.

It is preferable that the whole silver powder has a D10 of 1.00 to 3.00 µm, and a D50 of 3.00 to 7.00 µm. It is particularly preferable that the D10 of the whole silver powder is 1.20 to 2.00 µm, and that the D50 of the whole silver powder is 3.90 to 5.00 µm. When the D10 and the D50 of the whole silver powder meet the above-described requirements, a dry film density is increased, and a content of the silver powder having a small diameter in which migration easily occurs is reduced, and therefore, a short circuit between conductor films can be effectively inhibited.

In the silver powder, a content percentage of the first silver powder (a) ((the first silver powder (a)/(first silver powder (a)+second silver powder (b)))×100) is preferably 40 to 95% by mass, and particularly preferably 60 to 90% by mass. When the content percentage of the first silver powder (a) in the silver powder ((first silver powder (a)/(first silver powder (a)+second silver powder (b)))×100) falls in this range, a dry film density is increased, and migration is difficult to occur.

A specific surface area $S_{BET}$ of the whole silver powder is preferably 0.10 to 0.30 m$^2$/g, and particularly preferably 0.12 to 0.20 m$^2$/g. When the specific surface area $S_{BET}$ of the whole silver powder falls in this range, since the content of the silver powder having a small diameter in which migration easily occurs is small, a short circuit between conductor films is effectively inhibited. The $S_{BET}$ (m$^2$/g) refers to a specific surface area obtained by a BET method with helium gas adsorbed onto a surface of the silver powder.

The binder resin used in the silver paste of the present invention is not especially limited, and can be a binder resin used in a usual silver paste. Examples of the binder resin include celluloses, acrylic resins, phenol resins, epoxy resins, urethane resins, polyester resins and polyethylene resins.

The organic solvent used in the silver paste of the present invention is not especially limited, and can be an organic solvent used in a usual silver paste. Examples of the organic solvent include alcohol-based, ether-based, ester-based, and hydrocarbon-based organic solvents, water, and mixed solvents of these.

When a silver content of the silver paste is higher, a film with higher electrical conductivity can be obtained, but when the silver content is too high, printability is deteriorated. A content $C_{AG}$ of the silver powder in the silver paste of the present invention is preferably 80.00 to 97.00% by mass, and particularly preferably 92.00 to 96.00% by mass. When the content of the silver powder falls in this range, both electrical conductivity and printability can be increased. The content $C_{AG}$ (% by mass) of the silver powder in the silver paste refers to a content percentage of the silver powder based on the silver paste obtained in accordance with an equation "(content of silver powder/mass of silver paste)×100".

The dry film density of the silver paste of the present invention is preferably 7.50 g/cm$^3$ or more. A lower limit of the dry film density of the silver paste of the present invention is particularly preferably 7.60 g/cm$^3$, and most preferably 7.80 g/cm$^3$. An upper limit of the dry film density of the silver paste of the present invention is preferably as high as possible as long as printability is good, but does not exceed a density of silver (10.5 g/cm$^3$), and in consideration of workability, productivity and the like, the upper limit is about 8.50 g/cm$^3$ in reality. As a method for controlling the dry film density, the dry film density can be controlled by a widely known general method, and can be controlled by, for example, adjusting a particle size distribution or a surface state (such as smoothness, and whether surface-treated or not) of the silver powder, by changing the binder resin, the organic solvent or the like to be used, or if a dispersant is added to the paste, by changing the type or the amount of the dispersant to be added. In the present invention, the dry film density refers to a density of a dry film obtained by drying a coating film of the silver paste as it is without compression.

In an example described later, a silver paste to be measured is applied on a (polyethylene terephthalate) PET film in a thickness of about 150 μm, the resultant is temporarily dried at 80° C. for 10 minutes, and then the resultant paste together with the PET film is punched into a circular shape with a diameter of 15 mm, the resultant is finally dried at 150° C. for 1 hour, and then the PET film is peeled. A mass W and a volume V of the thus obtained dry film are measured to calculate a value W/V as the dry film density.

In the silver paste of the present invention, a content percentage $C_{BDN}$ of the binder based on the silver powder is preferably 0.430 to 0.750% by mass, and particularly preferably 0.440 to 0.600% by mass. When the content percentage of the binder based on the silver powder falls in this range, good printability is obtained, and in addition, a silver content of the silver paste can be increased. The $C_{BND}$ (% by mass) refers to a content percentage (% by mass) of the binder resin based on the silver powder obtained in accordance with an equation "(content of binder resin in silver paste/content of silver powder in silver paste)×100".

In the silver paste of the present invention, a value "$C_{BND}/S_{BET}$" is preferably 2.00 to 3.40, and further preferably 2.50 to 3.10, where $S_{BET}$ (m²/g) represents the specific surface area of the whole silver powder, and $C_{BND}$ (% by mass) represents the content percentage of the binder resin based on the silver powder. When the value $C_{BND}/S_{BET}$ falls in this range, good printability is obtained, and in addition, the silver content of the silver paste can be increased, and as a result, a conductor film having a high dry film density, and high denseness and conductivity can be easily obtained.

When all of the above-described requirements [1], [2], [3], and [4] are met in the silver paste of the present invention, a dense and highly conductive film can be obtained, and a conductor film having a low specific resistance can be formed, whereas a conductor film excellent in printability and excellent in coating film shape can be obtained, and in addition, excellent migration resistance can be obtained and occurrence of a short circuit between conductor films can be reduced. In an experimental example described below, the silver paste of the present invention is screen printed on a substrate to be printed, and the coating film shape (printing pattern) is evaluated to be preferable and printability is evaluated to be good as a value of a contact angle (rectangularity) between the substrate and the coating film is closer to 90°.

In the present invention, a production method for the silver powder is not especially limited, and the silver powder can be produced by, for example, conventionally known atomization method, wet reduction method and chemical vapor deposition (CVD) method, a physical vapor deposition (PVD) method as described in Japanese Patent No. 3541939, a spray pyrolysis method as described in Japanese Patent Publication No. 63-31522, a "method for pyrolyzing a pyrolytic metal-containing compound in a gas phase" as described in Japanese Patent No. 3812359, or the like. Among these methods, the PVD method, the spray pyrolysis method, and a production method by the "method for pyrolyzing a pyrolytic metal-containing compound in a gas phase" are preferred because a silver powder that is spherical, has a high crystallinity, and contains particles of uniform sizes can be easily obtained.

The silver paste of the present invention can appropriately contain, if necessary, an inorganic compound such as a glass frit or a metal oxide, and a plasticizer, a viscosity modifier, a surfactant, a dispersant, an oxidant or the like used as additives in a usual silver paste.

The silver paste of the present invention can be produced in accordance with a usual method by kneading and homogeneously dispersing the silver powder, the binder resin, the organic solvent, and an organic oxide, an additive and the like appropriately added if necessary, and then preparing the resultant into a paste rheology applicable to screen printing and other printing methods.

The silver paste of the present invention is used for forming an internal electrode, an external electrode, or a thick film conductor circuit included in an electronic component such as a multilayer ceramic capacitor, an inductor, or an actuator. In particular, the silver paste of the present invention is suitably used for forming an internal electrode of a multilayer inductor using, as a magnetic material, a dust core material, particularly a soft magnetic metal particle.

The term "printability" used herein will now be described to be more easily understood by exemplifying a multilayer inductor.

Usually, a multilayer inductor 10 includes, as in an example illustrated in FIG. 1, a base body 11, and a first external electrode 12 and a second external electrode 13 respectively covering a pair of end surfaces of the base body 11.

Figure 2:
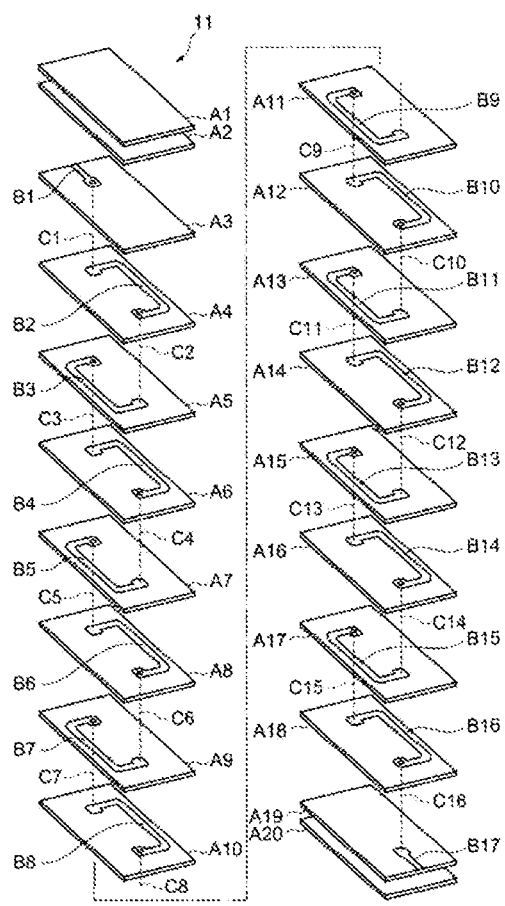
FIG. 2 is an exploded view of a base body portion of the multilayer inductor.

The base body 11 includes, as illustrated in FIG. 2, magnetic layers A1 to A20 and internal electrode layers B1 to B17 stacked on one another. Each of the magnetic layers A1 to A20 is obtained by preparing a magnetic paste by kneading, with an appropriate binder resin and an organic solvent, a core-shell composite particle (which is obtained by coating a surface of, for example, a soft magnetic iron alloy particle containing iron as a principal component with an insulating film of a resin, an oxide film or the like), forming the magnetic paste into a sheet shape, and drying the resultant. On the magnetic layers A3 to A19, the internal electrode layers B1 to B17 respectively in prescribed patterns are formed by a screen printing method. The silver paste of the present invention is used for forming these internal electrode layers. One end of the internal electrode layer B1 is exposed on an end surface of the magnetic layer A3 to be electrically connected to the external electrode 12, and one end of the internal electrode layer B17 is similarly electrically connected to the external electrode 13. The internal electrode layers B1 to B17 are electrically connected to one another via through-hole electrodes C1 to C16 formed through a thickness direction of the magnetic layers A3 to A19, and thus, the internal electrode layers B1 to B17 are formed as a whole in a coil shape in a stacking direction. In forming the internal electrode layers B1 to B17 on the magnetic layers A3 to A19, magnetic layers (not shown) in a shape capable of filling level differences caused by the thicknesses of the internal electrode layers B1 to B17 are preferably further stacked on the magnetic layers A3 to A19. The base body 11 including the magnetic layers A1 to A20 and the internal electrode layers B1 to B17 stacked on one another is baked at about 700° C. through thermocompression bonding, and then, the external electrodes 11 and 12 are formed in the pair of end portions, and thus, the multilayer inductor is obtained. Here, the external electrodes may be formed with the silver paste of the present invention, or may be formed with a conductive paste containing nickel or copper as a principal component.

Figure 3:
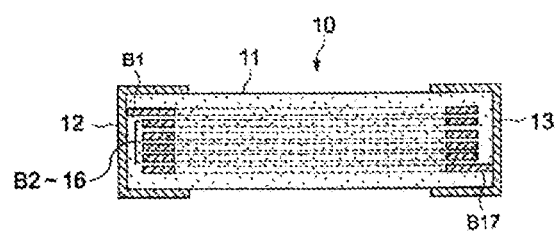
FIG. 3 is a schematic cross-sectional view taken along line X-X of FIG. 1.
Figure 4:
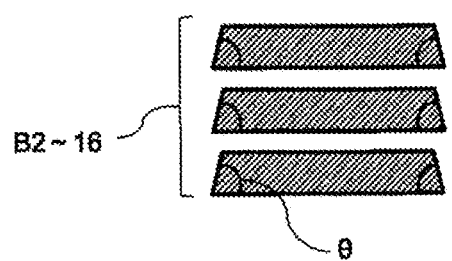
FIG. 4 is an enlarged schematic view of a part of FIG. 3.

The multilayer inductor of FIG. 1 thus produced has a cross-section taken along line X-X as illustrated in FIG. 3, and a part of the cross-section is illustrated in an enlarged view in FIG. 4. It is noted that both FIGS. 3 and 4 are schematic diagrams, and hence do not always accord with the contents and structure illustrated in FIG. 2 including the number of stacked layers. As illustrated in FIG. 3, the cross-sectional shape of each internal electrode layer is required to be ideally rectangular. Actually, however, the viscosity/flowability and the like of the paste affects in coating printing the silver paste on the substrate, and hence, the actual cross-sectional shape of each internal electrode layer is usually in a substantially trapezoidal shape as illustrated in FIG. 4. In order to make this shape to be closer to a rectangular shape, a paste having a property that the flowability is high in printing but viscosity is rapidly increased after the printing may be used. There are, however, a very large number of parameters to be controlled in a paste, and these parameters complicatedly affect one another, and hence, it is not too much to say that there is no case where expected results and properties can be obtained.

In this manner, the term "printability" herein means not only that printing can be performed with appropriate flowability in printing process by a screen printing method, a gravure printing method or the like but also that a high viscosity is rapidly exhibited after the printing to obtain a coating film (conductor film) in a shape closer to a rectangular shape.

The silver paste of the present invention is suitably used as a baked silver paste used for forming an internal electrode or an external electrode in a ceramic electronic component such as a multilayer ceramic capacitor, an inductor, or an actuator. The silver paste of the present invention is used, for example, for forming a conductor film by a heat treatment at 700° C. or less.

Now, the present invention will be described on the basis of specific experimental examples, and it is noted that the present invention is not limited to these examples.

EXAMPLES

<Production of Silver Powder>

First, silver powders 1 to 21 shown in Table 1 were prepared in accordance with the spray pyrolysis method described in Japanese Patent Publication No. 63-31522. Specifically, for each of the silver powders 6, 8, 13 to 17, and 19 to 21, an aqueous solution, which was obtained by dissolving silver salt and copper salt weighed so that a copper content of a resultant silver powder could be a value shown in a column of Whole Silver Powder of Table 1, was spray pyrolyzed, and the thus collected silver powder was subjected to a classification treatment to adjust values of D10 and D50. On the other hand, for the silver powders 1 to 5, 7, 9 to 12 and 18, an aqueous solution, which was obtained by dissolving silver salt and copper salt weighed so that a copper contained in a resultant silver powder could be a value shown in a column of First Silver Powder or Second Silver Powder of Table 1, was spray pyrolyzed, and the thus collected silver powder was subjected to a classification treatment to adjust values of D10 and D50, and then, the resultant first silver powder and second silver powder were mixed to obtain a mixed powder as the silver powder.

In each of these silver powders, a 10% value (D10) and a 50% value (D50) of a volume-based cumulative fraction were obtained with a laser diffraction particle size distribution measuring apparatus. Besides, a specific surface area ($S_{BET}$) was measured by the BET method, and aspect ratios of fifty silver particles arbitrarily selected through observation of an SEM (scanning electron microscope) image were measured to obtain an average thereof. Results are shown in Table 1.

TABLE 1

| Silver Powder No. | Whole Silver Powder | | | | | | First Silver Powder | | First Silver Powder/Whole Silver Powder (wt ratio) | Second Silver Powder | | |
|---|---|---|---|---|---|---|---|---|---|---|---|---|
| | D10 (μm) | D50 (μm) | $S_{BET}$ (m²/g) | Aspect Ratio | Cu Content (mass ppm) | Form | D50 (μm) | Cu Content (mass ppm) | | D10 (μm) | D50 (μm) | Cu Content (mass ppm) |
| 1 | 1.32 | 4.01 | 0.20 | 1.0 | 75 | Mixture of Two Silver Powders | 4.51 | 0 | 0.83 | 0.83 | 1.53 | 450 |
| 2 | 1.31 | 4.12 | 0.19 | 1.0 | 60 | Mixture of Two Silver Powders | 4.51 | 0 | 0.87 | 0.79 | 1.43 | 470 |
| 3 | 1.90 | 4.24 | 0.17 | 1.2 | 73 | Mixture of Two Silver Powders | 4.51 | 60 | 0.91 | 0.83 | 1.53 | 200 |
| 4 | 1.25 | 4.09 | 0.19 | 1.1 | 60 | Mixture of Two Silver Powders | 4.51 | 0 | 0.87 | 0.77 | 1.25 | 470 |
| 5 | 1.01 | 3.90 | 0.25 | 1.1 | 60 | Mixture of Two Silver Powders | 4.03 | 0 | 0.96 | 0.71 | 0.88 | 1500 |
| 6 | 2.20 | 4.40 | 0.14 | 1.1 | 50 | One Silver Powder | | | — | | | |
| 7 | 1.15 | 4.05 | 0.20 | 1.0 | 85 | Mixture of Two Silver Powders | 4.35 | 50 | 0.86 | 1.29 | 2.19 | 300 |
| 8 | 1.60 | 4.20 | 0.18 | 1.1 | 1000 | One Silver Powder | | | — | | | |
| 9 | 2.27 | 3.48 | 0.22 | 1.0 | 87 | Mixture of Two Silver Powders | 4.51 | 0 | 0.66 | 0.82 | 1.51 | 250 |
| 10 | 1.91 | 3.00 | 0.27 | 1.0 | 132 | Mixture of Two Silver Powders | 4.51 | 0 | 0.50 | 0.82 | 1.51 | 260 |
| 11 | 0.98 | 4.08 | 0.23 | 1.0 | 60 | Mixture of Two Silver Powders | 4.51 | 0 | 0.88 | 0.62 | 0.98 | 490 |
| 12 | 0.91 | 4.07 | 0.20 | 1.2 | 60 | Mixture of Two Silver Powders | 4.50 | 0 | 0.88 | 0.60 | 0.89 | 500 |
| 13 | 2.95 | 4.51 | 0.12 | 1.1 | 0 | One Silver Powder | | | — | | | |
| 14 | 1.30 | 4.10 | 0.20 | 1.1 | 60 | One Silver Powder | | | — | | | |
| 15 | 1.44 | 4.10 | 0.16 | 1.1 | 0 | One Silver Powder | | | — | | | |
| 16 | 1.06 | 2.30 | 0.33 | 1.0 | 60 | One Silver Powder | | | — | | | |
| 17 | 1.17 | 2.33 | 0.31 | 1.2 | 300 | One Silver Powder | | | — | | | |
| 18 | 0.98 | 4.08 | 0.22 | 1.1 | 60 | Mixture of Two Silver Powders | 4.51 | 50 | 0.89 | 0.50 | 0.74 | 150 |

TABLE 1-continued

| Silver Powder No. | Whole Silver Powder | | | | | | First Silver Powder | | | Second Silver Powder | | |
|---|---|---|---|---|---|---|---|---|---|---|---|---|
| | D10 (μm) | D50 (μm) | $S_{BET}$ (m²/g) | Aspect Ratio | Cu Content (mass ppm) | Form | D50 (μm) | Cu Content (mass ppm) | First Silver Powder/Whole Silver Powder (wt ratio) | D10 (μm) | D50 (μm) | Cu Content (mass ppm) |
| 19 | 3.11 | 4.98 | 0.17 | 1.1 | 60 | One Silver Powder | | | — | | | |
| 20 | 2.27 | 3.48 | 0.22 | 1.1 | 87 | One Silver Powder | | | — | | | |
| 21 | 0.65 | 1.06 | 0.4 | 1.1 | 300 | One Silver Powder | | | — | | | |
| 22 | 2.48 | 3.98 | 0.20 | 1.0 | 86 | Mixture of Two Silver Powders | 4.65 | 0 | 0.70 | 1.15 | 2.43 | 288 |

In Table 1, when the silver powder contains merely one type of silver powder, physical property values of the whole silver powder are the same as physical property values of the one type of silver powder, and when the silver powder is a mixture of two types of silver powders, physical property values of the whole silver powder correspond to physical properties of the mixture of the two types of silver powders.

Examples 1 to 9 and Comparative Examples 1 to 13

Each of silver paste samples a to u was produced by using each of the silver powders shown in Table 1 in a content $C_{AG}$ shown in Table 2, ethyl cellulose in a content $C_{BND}$ shown in Table 2, and terpineol (TPO) as the balance, and kneading them.

Next, each of the silver paste samples a to u was applied on a PET film into a size of 20 mm×20 mm×151 μm, the resultant was dried at 80° C. for 10 minutes, was punched with a punch of 15 mmΦ, and was further subjected to a drying treatment at 150° C. for 1 hour. Next, the mass W and the volume V of the thus obtained dry film were respectively measured to obtain a dry film density in accordance with the equation of W/V. Results are shown in Table 2. It is noted that the acceptable criterion of the dry film density was set to 7.50 g/cm³ or more.

Next, each of the silver paste samples was printed on a ceramic substrate by coating into a rectangular parallelepiped shape of 60 mm×0.6 mm×40 μm, the resultant was baked at 650° C. under an oxidative atmosphere (in the air) to form a conductor film, and an electrical resistance value was obtained by a four-terminal method to calculate a specific resistance. Results are shown in Table 2. It is noted that the acceptable criterion of the specific resistance was set to 1.90 μΩ·cm or less.

TABLE 2

| Sample | Silver Paste Sample | Silver Powder No. | $C_{AG}$[1] (mass %) | $C_{BND}$[2] (mass %) | Dry Film Density (g/cm³) | $C_{BND}/S_{BET}$ | Specific Resistance (μΩ·cm) |
|---|---|---|---|---|---|---|---|
| Example 1 | a | 1 | 95.23 | 0.525 | 7.87 | 2.63 | 1.80 |
| Example 2 | b | 2 | 95.25 | 0.525 | 7.89 | 2.76 | 1.81 |
| Comparative Example 1 | c | 3 | 95.03 | 0.525 | 7.55 | 3.09 | 1.91 |
| Example 3 | d | 4 | 95.15 | 0.525 | 7.90 | 2.76 | 1.87 |
| Example 4 | e | 5 | 94.84 | 0.525 | 7.85 | 2.10 | 1.85 |
| Comparative Example 2 | f | 6 | 94.80 | 0.450 | 7.75 | 3.21 | 1.92 |
| Comparative Example 3 | g | 7 | 94.76 | 0.480 | 7.60 | 2.40 | 1.92 |
| Comparative Example 4 | h | 8 | 94.90 | 0.500 | 7.70 | 2.78 | 1.93 |
| Example 5 | i | 9 | 94.59 | 0.700 | 7.80 | 3.18 | 1.82 |
| Example 6 | j | 10 | 94.80 | 0.600 | 7.56 | 2.22 | 1.89 |
| Example 7 | k | 11 | 95.30 | 0.525 | 8.04 | 2.28 | 1.84 |
| Example 8 | l | 12 | 95.13 | 0.525 | 8.07 | 2.63 | 1.85 |
| Comparative Example 5 | m | 13 | 94.41 | 0.525 | 6.87 | 4.38 | 2.30 |
| Comparative Example 6 | n | 14 | 94.00 | 0.480 | 7.10 | 2.40 | 2.10 |
| Comparative Example 7 | o | 15 | 95.15 | 0.525 | 7.65 | 3.28 | 1.91 |
| Comparative Example 8 | p | 16 | 94.38 | 0.420 | 7.40 | 1.27 | 2.05 |
| Comparative Example 9 | q | 17 | 95.08 | 0.420 | 7.30 | 1.35 | 2.09 |
| Comparative Example 10 | r | 18 | 94.31 | 0.780 | 8.02 | 3.55 | 1.91 |
| Comparative Example 11 | s | 19 | 91.83 | 0.990 | 7.50 | 5.82 | 1.94 |
| Comparative Example 12 | t | 20 | 94.61 | 0.420 | 7.85 | 1.91 | 1.93 |

TABLE 2-continued

| Sample | Silver Paste Sample | Silver Powder No. | $C_{AG}$[1] (mass %) | $C_{BND}$[2] (mass %) | Dry Film Density (g/cm³) | $C_{BND}/S_{BET}$ | Specific Resistance (μΩ·cm) |
|---|---|---|---|---|---|---|---|
| Comparative Example 13 | u | 21 | 94.62 | 0.760 | 7.16 | 1.90 | 2.10 |
| Example 9 | v | 22 | 95.50 | 0.525 | 7.65 | 2.63 | 1.89 |

[1]Content of silver powder in silver paste: (silver powder/silver paste) × 100
[2]Content of ethyl cellulose in silver powder: (ethyl cellulose/silver powder) × 100

Examples 10 to 18 and Comparative Examples 14 to 26

On a magnetic layer having a thickness of 30 μm previously prepared, a rectangular parallelepiped pattern was formed by a screen printing method with each of the silver paste samples a to u obtained as described above, and a magnetic layer was further printed thereon to fill a level difference caused by the thickness of the pattern. Assuming that the resultant was one set, three sets were stacked on one another, and covering magnetic layers were further stacked respectively on uppermost and lowermost portions. Next, the resultant was subjected to thermocompression bonding, was degreased under an oxidative atmosphere, and was baked at 650° C. to obtain a laminate.

Next, the thus obtained laminate was used to evaluate printability. Specifically, the laminate was cut as illustrated in FIG. 4, and the rectangularity of the cross-sections of conductor films was observed to measure an average of angles shown as θ in FIG. 4. Results are shown in Table 3. It is noted that the acceptable criterion of the printability was set to 55° or more, and preferably 65° or more.

Besides, twenty-five laminates were produced in the same manner as described above, and short circuit ratios of the laminates were measured. Specifically, electrical resistance between the upper most layer and the middle layer, and between the middle layer and the lower most layer in the three conductor films of each laminate was measured, and this measurement was performed repeatedly on the prepared twenty-five laminates. A ratio of the number of times of electrical conduction out of the total number of times of the measurement was defined as a short circuit ratio. Results are shown in Table 3. It is noted that the acceptable criterion of the short circuit ratio was set to 5% or less, and preferably 3% or less.

TABLE 3

| Sample | Laminate | Silver Paste Sample | Rectangularity θ (°) | Short Circuit Ratio (%) |
|---|---|---|---|---|
| Example 10 | A | a | 65 | 0% |
| Example 11 | B | b | 65 | 0% |
| Comparative Example 14 | C | c | 70 | 2% |
| Example 12 | D | d | 60 | 2% |
| Example 13 | E | e | 65 | 2% |
| Comparative Example 15 | F | f | 65 | 0% |
| Comparative Example 16 | G | g | 60 | 0% |
| Comparative Example 17 | H | h | 65 | 0% |
| Example 14 | I | i | 60 | 0% |
| Example 15 | J | j | 60 | 0% |
| Example 16 | K | k | 65 | 4% |
| Example 17 | L | l | 61 | 4% |
| Comparative Example 18 | M | m | 72 | 16% |
| Comparative Example 19 | N | n | 55 | 0% |
| Comparative Example 20 | O | o | 58 | 86% |
| Comparative Example 21 | P | p | 50 | 0% |
| Comparative Example 22 | Q | q | 50 | 0% |
| Comparative Example 23 | R | r | 48 | 30% |
| Comparative Example 24 | S | s | 45 | 0% |
| Comparative Example 25 | T | t | 50 | 0% |
| Comparative Example 26 | U | u | 65 | 60% |
| Example 18 | V | v | 65 | 0% |

The invention claimed is:

1. A silver paste comprising at least a silver powder, a binder resin, and an organic solvent,
   wherein the silver powder satisfies all of the following conditions [1] to [4]:
   [1] the silver powder contains a first silver powder (a) having a D50 of 3.50 to 7.50 μm and a second silver powder (b) having a D50 of 0.80 to 2.70 μm, where D50 represents a 50% value of a volume-based cumulative fraction obtained by laser diffraction particle size distribution measurement;
   [2] a copper content of the silver powder is 10 to 5000 ppm by mass;
   [3] a copper content of the second silver powder (b) is 80 ppm by mass or more; and
   [4] the first silver powder (a) contains substantially no copper.

2. The silver paste according to claim 1, wherein the second silver powder (a) has a D10 of 0.70 μm or more, where D10 represents a 10% value of a volume-based cumulative fraction obtained by laser diffraction particle size distribution measurement.

3. The silver paste according to claim 1 or 2, wherein a copper content of the first silver powder (a) is less than 50 ppm by mass.

4. The silver paste according to claim 1, wherein the first silver powder (a) has a D50 of 3.70 to 7.50 μm.

5. The silver paste according to claim 4, wherein the first silver powder (a) has a D50 of 4.00 to 6.00 μm.

6. The silver paste according to claim 1, wherein the second silver powder (b) has a D50 of 0.80 to 2.00 μm.

7. The silver paste according to claim 1, wherein the silver powder has a D10 of 1.00 to 3.00 μm, and a D50 of 3.00 to 7.00 μm.

8. The silver paste according to claim 7, wherein the silver powder has a D10 of 1.20 to 2.00 μm.

9. The silver paste according to claim 7 or 8, wherein the silver powder has a D50 of 3.90 to 5.00 μm.

10. The silver paste according to claim 1, wherein a copper content of the silver powder is 30 to 500 ppm by mass.

11. The silver paste according to claim 1, further satisfying the following condition [5]:

[5] a content $C_{AG}$ of the silver powder based on the silver paste is 80.00 to 97.00% by mass.

12. The silver paste according to claim 11, wherein the content $C_{AG}$ of the silver powder based on the silver paste is 92.00 to 96.00% by mass.

13. The silver paste according to claim 1, wherein the silver paste has a dry film density of 7.50 g/cm$^3$ or more.

14. The silver paste according to claim 1, wherein a value $C_{BND}/S_{BET}$ is 2.00 to 3.40, where $S_{BET}$(m$^2$/g) represents a specific surface area of the silver powder, and $C_{BND}$(% by mass) represents a content percentage of the binder resin based on the silver powder.

15. The silver paste according to claim 1, wherein a specific surface area $S_{BET}$ of the silver powder is 0.10 to 0.30 m$^2$/g.

16. The silver paste according to claim 1, to be used for forming a conductor film by a heat treatment at 700° C. or less.

17. The silver paste according to claim 1, wherein a content percentage of the first silver powder (a) ((the first silver powder (a)/(the first silver powder (a)+the second silver powder (b)))×100) is 40 to 95% by mass in the silver powder.

18. The silver paste according to claim 17, wherein the content percentage of the first silver powder (a) ((the first silver powder (a)/(the first silver powder (a)+the second silver powder (b)))×100) is 60 to 90% by mass in the silver powder.

* * * * *